J. E. HETTINGER.
SPRING WHEEL.
APPLICATION FILED FEB. 16, 1920.
1,403,495.
Patented Jan. 17, 1922.
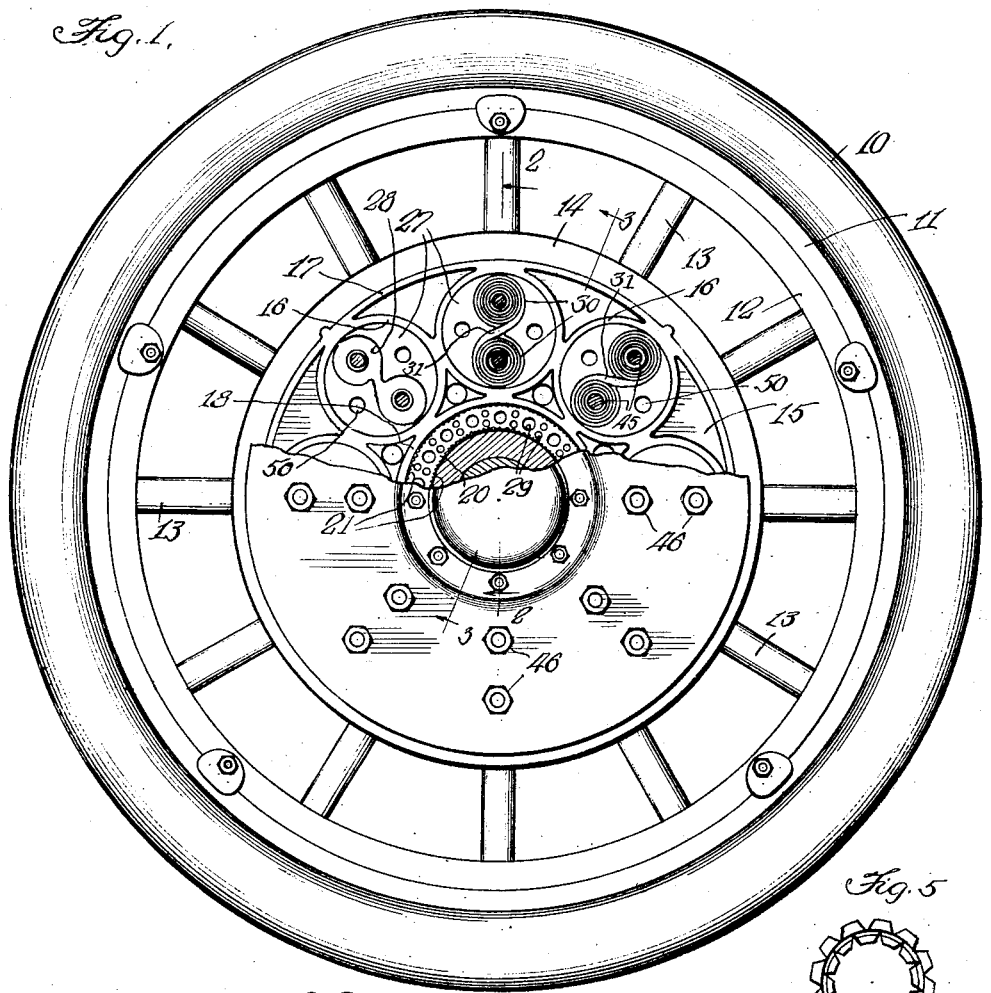
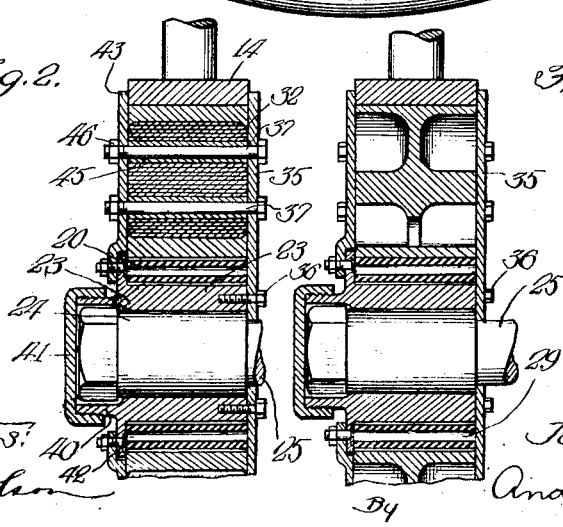
Inventor:
Julius E. Hettinger
By Andrews & Lundell
attys

UNITED STATES PATENT OFFICE.

JULIUS E. HETTINGER, OF CHICAGO, ILLINOIS.

SPRING WHEEL.

1,403,495.  Specification of Letters Patent.  Patented Jan. 17, 1922.

Application filed February 16, 1920. Serial No. 358,842.

*To all whom it may concern:*

Be it known that I, JULIUS E. HETTINGER, a citizen of the United States, residing at Chicago, in the county of Cook and State of Illinois, have invented certain new and useful Improvements in Spring Wheels, of which the following is a specification.

This invention relates to cushion wheels, and particularly to that class of wheels which has cushioning means otherwise than the ordinary pneumatic or solid rubber tires. It has for an object providing suitable cushioning means which will not only assist in eliminating shocks and add to the comfort of the riders of the vehicle, but that will materially assist in reducing wear and injuries to tires, and also to other portions of the vehicle itself, by increasing the resiliency of the wheel, and its ability to absorb shocks.

Of the accompanying drawings Fig. 1 is an elevation of a wheel, partly broken away, with cushioning means fixed thereto which embody features of my invention; Fig. 2 is an enlarged sectional view along the line 2—2 of Fig. 1; Fig. 3 is an enlarged sectional view along the line 3—3 of Fig. 1; Fig. 4 is a perspective view of one of the elements of the invention; and Fig. 5 is a modified form of one of the cushioning elements, reduced in size.

The cushioning means which I have provided may be applied to a wheel having any form of tire, such as the pneumatic tire or the solid rubber tire, and comprises means located near the central portion of the wheel which are adapted to resiliently resist the stresses which arise between the tire of the wheel and the axle, such as radial, tortional or transverse stresses.

The wheel to which I have applied my invention for the purposes of illustration comprises the tire 10 mounted, in an ordinary manner, on the rim 11 fixed to the felly 12, and having spokes 13. The inner ends of the spokes are fixed in a ring 14. Pressure exerted outwardly on the inner surface of the ring 14 is resisted by the spokes and the rim 11, and a frame 15 is pressed within the ring 14 and is adapted to carry the cushioning means which I use, as well as the hub and axle bearing. Projections extending across the periphery of the frame, and passing into corresponding grooves in the inner surface of the ring 14, prevent any relative rotation of the frame and ring.

The frame 15 may be composed of any suitable material. I prefer for the purpose a cast steel frame, and it comprises a plurality of cylinders 16 mounted between an outer rim 17 and an inner rim 18, the cylinders being spaced equal distances apart, and extending lengthwise substantially the same distance as the width of the ring 14. The spaces between the cylinders may be formed in any suitable manner, web-shaped, or they may merely comprise openings if desired to make the frame sufficiently light. Within the inner rim 18 is a cylindrical shaped member 20 composed of suitable yielding and resilient material, such as soft rubber. This cylinder of rubber has grooves or corrugations 21 on its inner and outer surfaces, to provide yielding surfaces which are cushioned more or less by the entrained air; and the cylinder has also a plurality of longitudinal openings 29 extending from one end to the other which allow very material yielding tendency of the walls of the cylinder so that the members within the cylinder 20 are at liberty to move more or less easily radially and outwardly. Within the cylinder is a hub 23 which carries a bearing 24 for the axle, and the end of the axle 25 is mounted in the ordinary manner in this bearing.

Mounted in each of the cylinders 16 is a pair of members 27 which substantially fills the cylinder except that they form between them two cylindrical shaped openings 28, and in these openings is mounted a pair of coil springs 30, the coils being connected by a continuation of the coils which forms a heavy connecting member 31. The members 27 and the coil springs extend longitudinally through the cylinders substantially the full length of the cylinders, and an annular flange 32 is formed on each end of each cylinder, so as to hold the members 27 and the springs 30 in place after they are forced into the cylinder 16.

On the inner side of the wheel is a plate 35 through which passes the end of the axle 25, and which extends outwardly to substantially the outer surface of the ring 14, normally fitting snugly but not tightly against the ring. This plate is fixed to the hub 23 by means of bolts 36; and bolts 37 pass through the respective center turns of the springs 30, and also through the plates 35, thus preventing any relative movement of the coil centers and the plate. On the outer side of the wheel is mounted a flange 40 which is fixed to the hub of the wheel and extends outwardly carrying the cap 41 to cover, in an ordinary manner, the end of the axle. The hub also has an annular flange 42 extending outwardly radially from the flange; and fixed to this flange 42 is a plate 43 which extends outwardly substantially to the outer surface of the ring 14; and the bolts 37 also pass through this plate 43. Thimbles 45 encircle the bolts 37; and these thimbles, together with the walls of the cylinder 16 and the rims 17 and 18, hold the plates 35 and 43 apart sufficiently so that the nuts 46 may be screwed tightly on the bolts 37 without pressing the plates 35 and 43 unduly against the ring 14.

It will be seen by a consideration of the cushioning means which I have provided and described, that the axle with its bearing will be yieldingly held in the ring 14, so that they are at liberty to move more or less towards the ring depending upon the weight of the vehicle and the various conditions which produce stresses between the axle and the tire of the wheel. The structure of the cylinder 20 is such that it will yield sufficiently to allow the greater portion of the stresses to be overcome by the coil springs, but at the same time will prevent serious shocks in case the limit of the resistance of the coil springs is substantially reached. The coil springs are sufficiently stiff to spring but a little because of minor shocks, the purpose being to care for the heavier jars which may largely overcome the yielding of the tires; and the springs on the rear wheels are made stronger than those on the front wheels, as they have more weight to overcome.

I am aware that cushioning means somewhat similar in general to those which I have herein described have been provided by others, but I wish to call particular attention to the details of some of the means which I provide, and which I believe materially increase the value of the cushioning means. The entire cushioning structure may be removed from the wheel as a unit, and repaired and replaced very conveniently, and the plate 45 may be conveniently removed so as to get at the elements of the cushioning means. The double coil spring is such that the two coils act together both radially and tortionally, so that the coils need not be so stiff as if a single coil spring were used. Also the two coils are connected by the stiff connecting strap 31, which does not yield materially, but will yield somewhat when the coils themselves have substantially reached their limits. The connecting strap will thus come into play at the times of greatest stress to prevent shocks. The enclosing members 27 are composed of any suitable slightly yielding material, such as rubber, and are adapted not only to hold the outer portion of the coils in place, but to reduce somewhat the shock due to very severe sudden stresses. To make them more yielding they have openings or recesses therein, such as the openings 50. And also the cylindrical member 20, having longitudinal openings therethrough, materially assists in the cushioning effect, particularly in the elimination of severe shocks; and it is to be understood that recesses as well as openings may be used, and other changes in the exact shape of this and other members might be made without departing from the spirit of my invention. One pair of springs 30 is omitted from the drawing to more clearly show the containing members 27.

A modification of the member 20 is shown in Fig. 5, which in some cases may be preferable. It is, of course, to be understood that the brake drums may be fastened to the plates 35, in any suitable manner.

I claim as my invention:

1. In a cushion wheel a hub, and an outer rim, a cylindrical framework positioned between said hub and said rim, said framework being fixed to said rim but movably mounted with reference to said hub, said framework having a cylindrical bore into which said hub projects, resilient means between said hub and the wall of said bore, said framework having a plurality of cylindrical openings, a cylindrical coil spring in each of said openings, a mass of rubber in each of said openings enclosing said spring, the center end of each of said springs being immovable with reference to said hub, the other end of said spring being yieldingly held by said rubber masses.

2. In a cushion wheel a hub and an outer rim, a rim encircling but spaced a material distance from and normally concentric with said hub, said ring being fixed with reference to said rim, a plate fixed to said hub and extending radially outwardly, the periphery of said plate extending beyond the inner surface of said ring but slidable with reference thereto, a plurality of coil springs, the inner end of each of said springs being fixed to said plate, and a cylindrical shaped mass of rubber encircling each of said springs and being stationary with reference to said ring.

3. In a cushion wheel, a hub, and an outer rim, an annular frame encircling but spaced from said hub, said frame being fixed with reference to said rim, cushioning means mounted between the periphery of said hub and the inner surface of the annular frame, a plurality of cylindrical casings fixed in said frame between its outer and inner surfaces, a plurality of coil springs mounted in each of said casings one end of each of said springs being stationary with reference to said hub, and a cylindrical mass of rubber in each of said casings and enclosing said spring therein.

4. In a cushion wheel, a tire rim, a ring within and concentric with said rim, spokes connecting said ring and said rim, a hub within and concentric with said ring, the outer diameter of said hub being materially less than the inner diameter of said ring, a plurality of coil springs positioned between said ring and hub, one end of each of said springs being mounted immovable with reference to said hub, said coils being arranged in pairs positioned radially, the other ends of the springs of each pair being connected to each other, and a mass of rubber enclosing each of said pairs.

5. In a cushion wheel a ring within and connected to the tire rim of the wheel and concentric therewith, a hub within and normally concentric with said ring, a plate having a large central opening fixed to said hub, said plate extending outwardly radially beyond the inner edge of said ring, and pairs of coil springs positioned between said ring and said hub, one end of each of said springs being fixed to said plate, and resilient means relatively associating the said ring and the other ends of the springs, and a relatively stiff but resilient member connecting the outer ends of each pair of adjacent springs.

6. In a cushion wheel a ring within and connected with the tire rim of the wheel, a hub within and concentric with said ring, an annular frame positioned between said ring and said hub, and rigidly fixed to said ring, said frame having a plurality of openings therethrough, yielding means positioned in said openings, and coil springs held in place by said yielding means, the inner end of each of said springs being immovable with reference to said hub, the other end being fixed to the outer end of an adjacent spring.

In testimony whereof, I hereunto set my hand.

JULIUS E. HETTINGER.